(12) United States Patent
Palocz-Andresen

(10) Patent No.: US 6,532,793 B1
(45) Date of Patent: Mar. 18, 2003

(54) MEASUREMENT OF CONTAMINANT COMPONENTS IN EXHAUST GAS AND REDUCTION OF EXCESSIVE CONTAMINANT EMISSIONS DURING COLD STARTS AND WHILE DRIVING

(75) Inventor: Michael Palocz-Andresen, Hamburg (DE)

(73) Assignee: Wissenschaftliche Werkstatt fur Umweltmesstechnik GmbH (DE)

( * ) Notice: Subject to any disclaimer, the term of this patent is extended or adjusted under 35 U.S.C. 154(b) by 0 days.

(21) Appl. No.: 09/647,313

(22) Filed: Sep. 27, 2000

Related U.S. Application Data

(63) Continuation of application No. PCT/DE98/03305, filed on Nov. 4, 1998.

(30) Foreign Application Priority Data

| Nov. 30, 1997 | (DE) | 197 53 006 |
| Mar. 9, 1998 | (DE) | 198 09 798 |
| Jun. 14, 1998 | (DE) | 198 26 179 |
| Jul. 5, 1998 | (DE) | 198 29 892 |
| Jul. 29, 1998 | (DE) | 198 34 037 |

(51) Int. Cl.$^7$ .............................................. G01M 15/00
(52) U.S. Cl. ..................................... 73/23.31; 73/118.1
(58) Field of Search ...................... 73/23.31, 23.32, 73/116, 117.2, 117.3, 118.1

(56) References Cited

U.S. PATENT DOCUMENTS

| 3,852,730 | A | | 12/1974 | Commins |
| 5,163,412 | A | | 11/1992 | Neu et al. |
| 5,431,042 | A | * | 7/1995 | Lambert et al. ............... 73/116 |
| 5,678,402 | A | | 10/1997 | Kitagawa et al. |
| 5,750,886 | A | * | 5/1998 | Lambert et al. ............. 340/439 |
| 5,787,705 | A | * | 8/1998 | Thoreson ...................... 60/274 |

FOREIGN PATENT DOCUMENTS

| DE | 34 09 948 A1 | 9/1985 |
| DE | 40 05 803 A1 | 8/1990 |
| DE | 196 45 202 A1 | 6/1997 |
| EP | 0 427 087 A2 | 5/1991 |
| EP | 0 454 937 A1 | 11/1991 |
| EP | 0 601 314 A1 | 6/1994 |
| EP | 0 609 527 A1 | 8/1994 |
| EP | 0 844 373 A1 | 5/1998 |
| JP | 04 017710 A | 1/1992 |
| JP | 06 087354 A | 3/1994 |
| JP | 08 077471 A | 7/1996 |
| JP | 09 240431 A | 9/1997 |
| WO | WO 96 30736 | 10/1996 |

* cited by examiner

*Primary Examiner*—Eric S. McCall
(74) *Attorney, Agent, or Firm*—Schnader Harrison Segal & Lewis LLP

(57) ABSTRACT

This invention pertains to the emission control in motor vehicles but also in ships, airplanes and diesel locomotives. The control system may either be fitted into new vehicles by the manufacturer or be retrofitted by the driver in older vehicles. An adsorption system serves to reduce the vehicle emissions during the cold-start period, in case of malfunctions in the engine or in the exhaust gas after-treatment system and in times of high quantities of pollutants in the atmosphere. To regenerate the adsorbent masses, the pollutants will be desorbed, introduced into the combustion chamber and burned.

4 Claims, 10 Drawing Sheets

FIG. 2
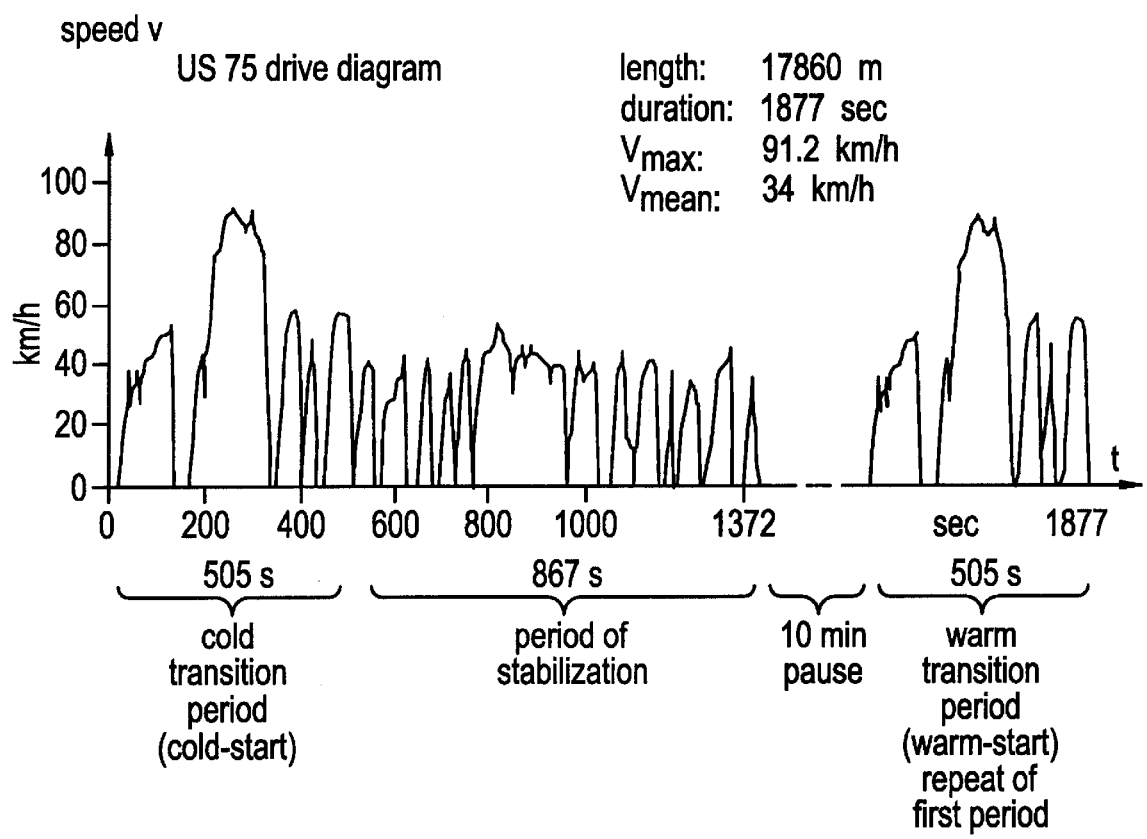
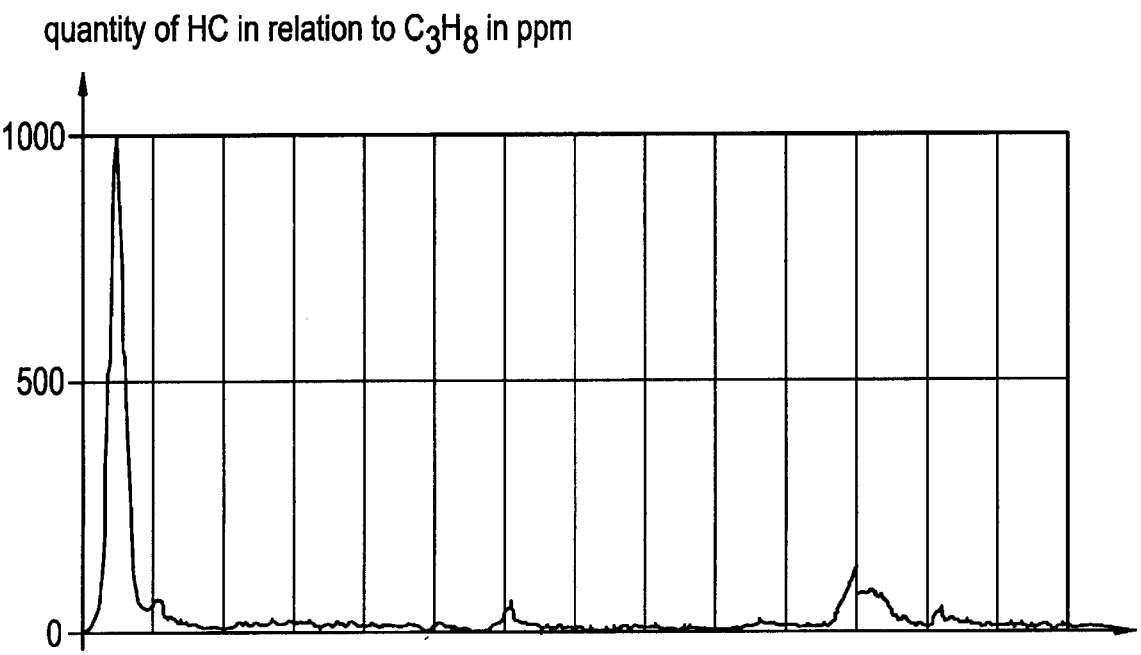

FIG. 9
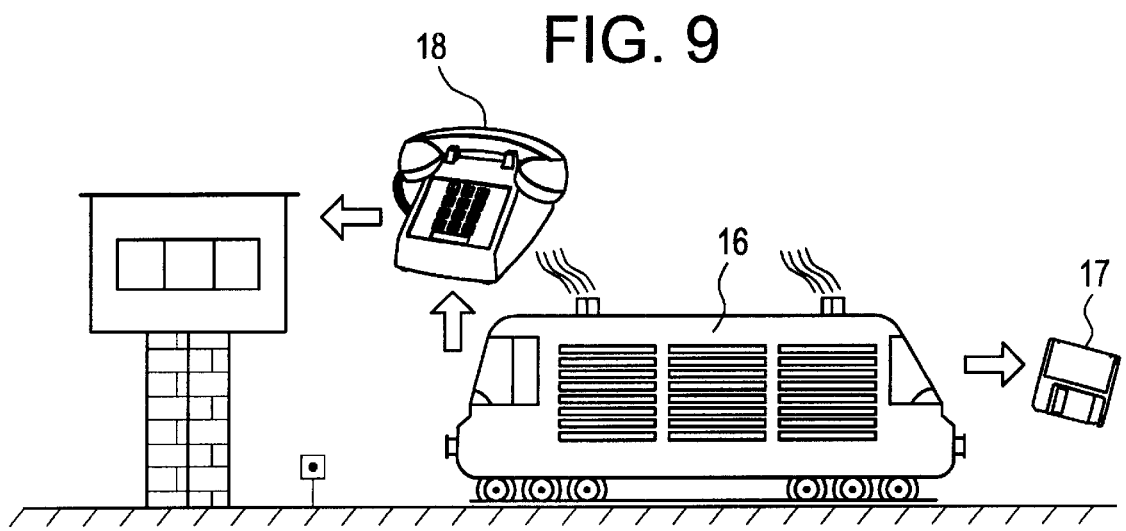
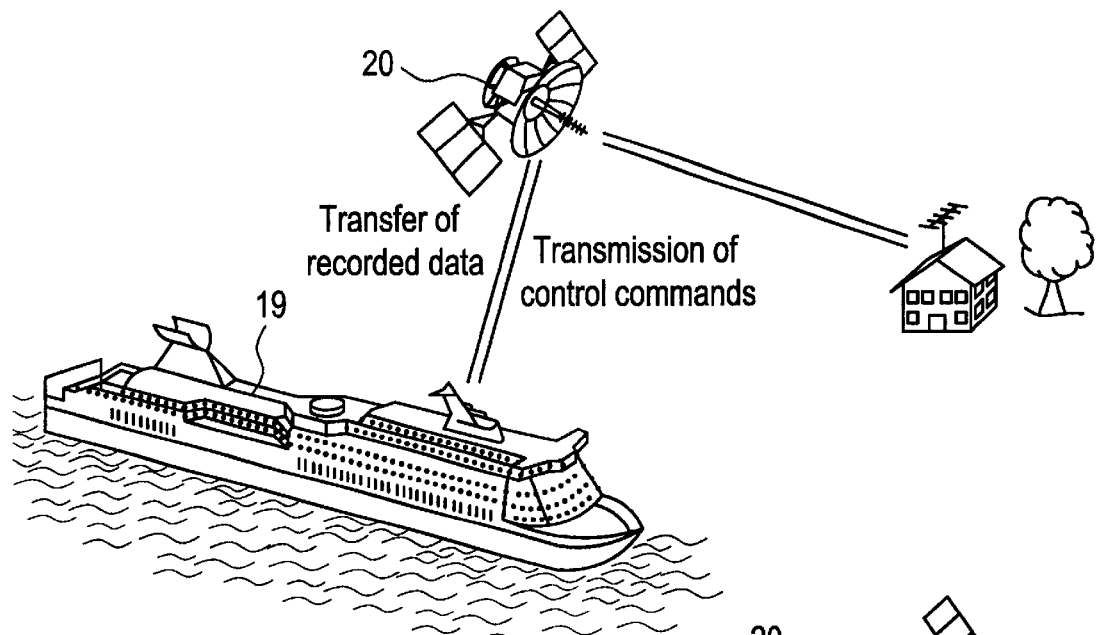
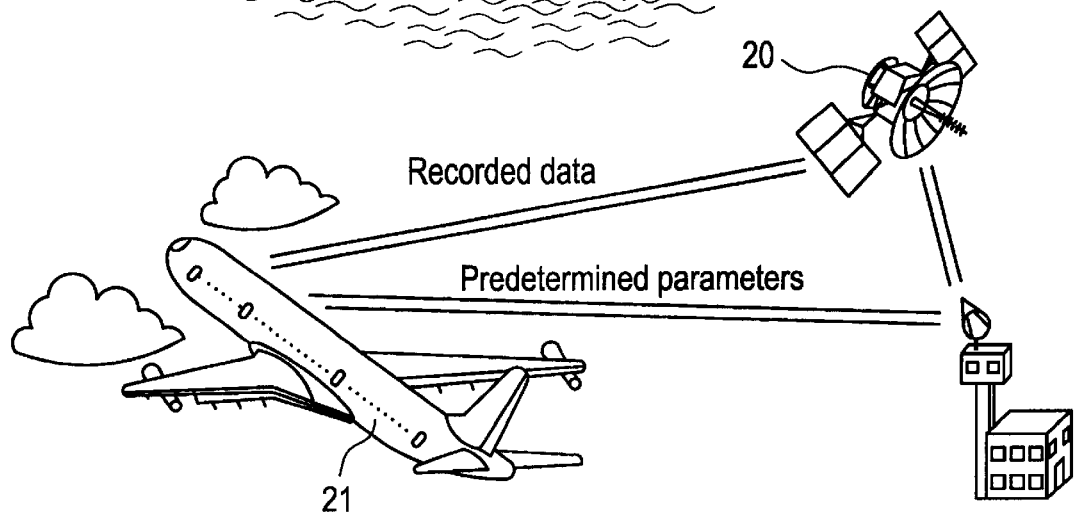

MEASUREMENT OF CONTAMINANT COMPONENTS IN EXHAUST GAS AND REDUCTION OF EXCESSIVE CONTAMINANT EMISSIONS DURING COLD STARTS AND WHILE DRIVING

RELATED APPLICATION

This is a continuation of International Application No. PCT/DE98/03305, with an international filing date of Nov. 4, 1998, which is based on German Patent Application Nos. DE 197 53 006.0, filed Nov. 30, 1997, DE 198 09 798.0, filed Mar. 9, 1998, DE 198 26 179.9, filed Jun. 14, 1998, DE 198 29 892.7, filed Jul. 5, 1998, and DE 198 34 037.0, filed Jul. 29, 1998.

BACKGROUND

In recent years, efforts to reduce emissions of exhaust gases have substantially increased. The reason for these efforts is the strong rise in transportation means causing emissions. Therefore, it would be most efficient to develop new transportation means which have low emission levels and consume energy economically.

During a driving cycle, the exhaust emission of motor vehicles consist of two basic periods:

the cold-start period with high emission values and a subsequent period with low emission values when the engine is warm.

The fact that the emissions of a vehicle driving on the road cannot be established on the roller-type test stand under specified conditions is a major problem. As a result, a test carried out on the roller-type test stand cannot be regarded as being totally complete, but rather as a partial examination. In addition to the tests on the test stand, the observance of emission standards for Ultra-Low-Emission-Vehicles (ULEV) as well as EURO III and IV will, therefore, be ascertained through the use of new in-situ control technologies.

In the USA, passenger cars may be equipped with an On-Board-Diagnosis (OBD) II-System which requires emission-related components to be monitored, such as lambda sensor, fuel system, secondary air system, exhaust gas circulation system, tank ventilation and the control of interruptions in combustion. However, the amounts of pollutants will not be measured. They are indirectly correlated with suitable sensor signals. German Patent 197 36 864.6: Vorrichtung zur Analyse des Abgases von Kraftfahrzeugen discloses a process for measuring emissions during driving. However, the amounts to be measured when the engine of the vehicle is warm are so low that measuring signals can hardly be detected in the natural noise.

For the three-way catalytic converter, there exists only one limit value of hydrocarbon (HC) whose observance is indirectly monitored through the ability of the catalytic converter to store oxygen. For this purpose, the measuring signals of two lambda sensors respectively located before and after the catalytic converter are compared and the signal ratio is correlated with the amount of hydrocarbons converted. This technique does not provide results on the actual HC emissions. For vehicles with ever-decreasing emission standards, however, direct measuring of emission quantities is more favorable.

In recent years, catalytic converter systems have been developed which fully reach their operating temperature within one minute. As a result, vehicle emissions are reduced to a minimum as opposed to the former situation where most of the pollutants were released during the cold-start period thus accounting for the greatest share of total emissions. In this case, after-burning, subsequent treatment or electric heating play an important role.

Furthermore, reduction systems have been developed in which an additional substance will be added to the exhaust flow to trigger a chemical reaction to achieve the desired change in the composition of the exhaust gases. Absorbent materials serve to retain pollutants during the cold-start period. The retained pollutants will be desorbed when the engine and the catalytic converter are warm. The adsorbent materials are used to retain unburned hydrocarbons based on activated carbons and to collect nitrogen oxides based on zeolite, for example. However, a process which makes it possible to reduce emission quantities in the exhaust gases not only during the cold-start period, but also in difficult situations as, for example, when defects occur in the combustion system or in the exhaust gas after-treatment system is needed.

In addition, the problem of how to make the emission measurement system suitable for use in airplanes, ships and diesel locomotives has not yet been dealt with.

SUMMARY OF THE INVENTION

This invention pertains to the emission control in motor vehicles but also in ships, airplanes and diesel locomotives. The control system may either be fitted into new vehicles by the manufacturer or be retrofitted by the driver in older vehicles. An adsorption system serves to reduce the vehicle emissions during the cold-start period, in case of malfunctions in the engine or in the exhaust gas after-treatment system and in times of high quantities of pollutants in the atmosphere. To regenerate the adsorbent masses, the pollutants will be desorbed, introduced into the combustion chamber and burned.

BRIEF DESCRIPTION OF THE DRAWINGS

FIG. 2 schematically shows drive diagram of an American US 75-test cycle (top) with the corresponding vehicle emissions (bottom).

FIG. 9 schematically shows transfer of data between transportation means and control center.

DETAILED DESCRIPTION OF THE INVENTION

Vehicle emissions will be assessed by means of a monitoring system. This monitoring system may be fitted into new vehicles or may be subsequently fitted as a modular device into older vehicles. To retrofit the set, the existing construction does not need to be modified.

It is very difficult to assess slight changes in the vehicle emissions under severe daily driving conditions. There are two alternatives:
  assessment of vehicle emissions during the cold-start period and
  measurement of emission quantities in the exhaust system during driving.

Figure 1:
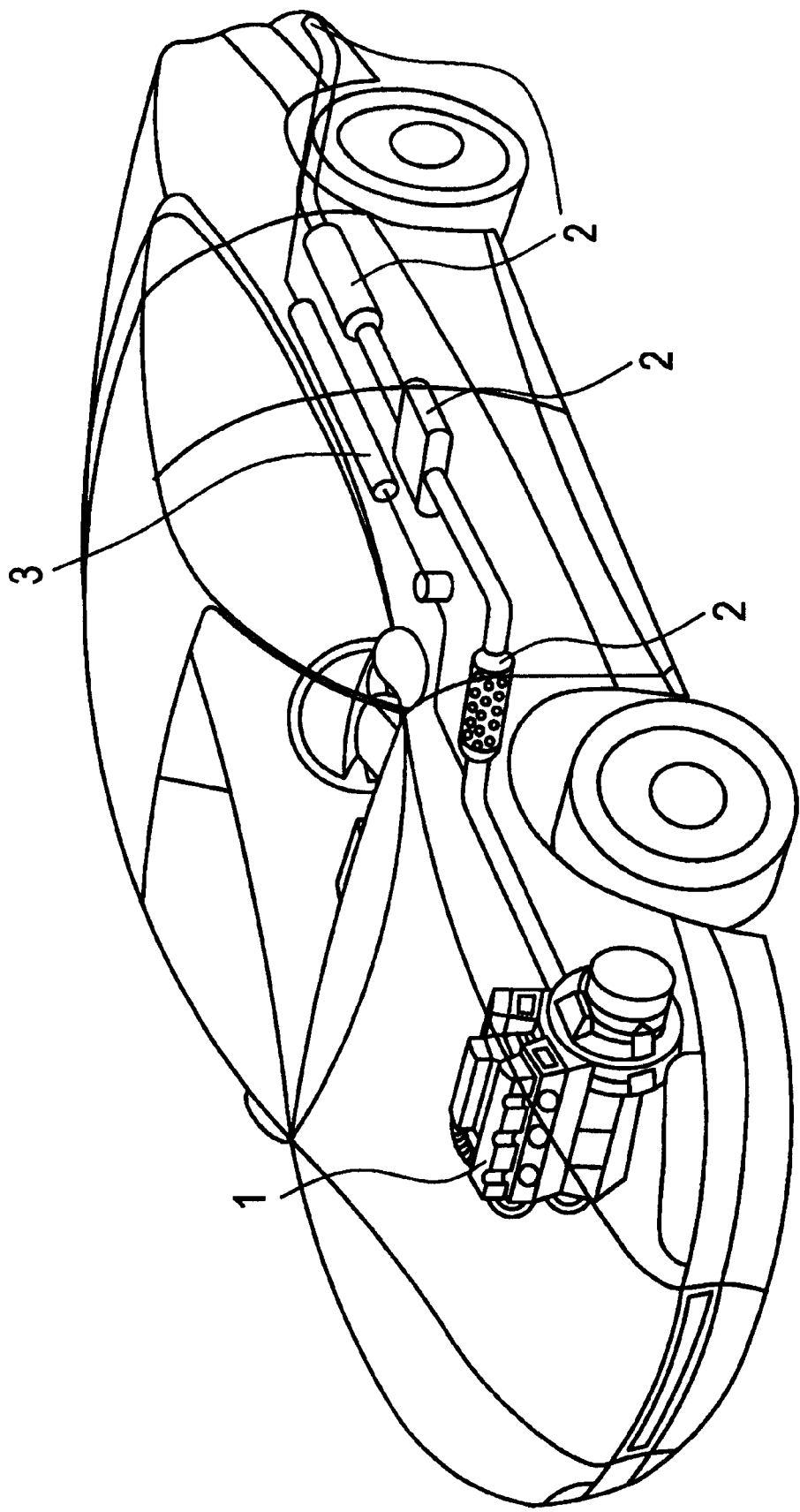
FIG. 1 schematically shows the main components of a vehicle combustion system.

The combustion system of a vehicle basically consists of two elements which include the engine 1 and the exhaust gas after-treatment system 2 as shown in FIG. 1. The values measured after the engine provide information on the combustion process and the measuring signals which develop after the catalytic converter provide information on the condition of the exhaust gas after-treatment system. The quantities of the most important pollutants measured at both locations greatly differ from each other.

The quantities behind the engine are 10–100 times higher than those behind the catalytic converter which properly operates from a technical point of view. The measuring system 3 actively measures at both locations.

FIG. 2 depicts measurement according to the American US 75-cycle in a Low-Emission-Vehicle (LEV) recorded behind the catalytic converter. Despite the effects resulting from braking and acceleration, this diagram hardly shows any emissions after the cold-start period. It is almost impossible to establish minor slowly proceeding damages in these vehicles exclusively on the basis of these quantity values. This is due to the fact that measuring signals are assessed with respect to the zero point and the signals are also subject to natural fluctuations. It is almost impossible to tell an increase in quantity caused by minor damage from an increase in the noise level caused by external impacts.

Figure 3:
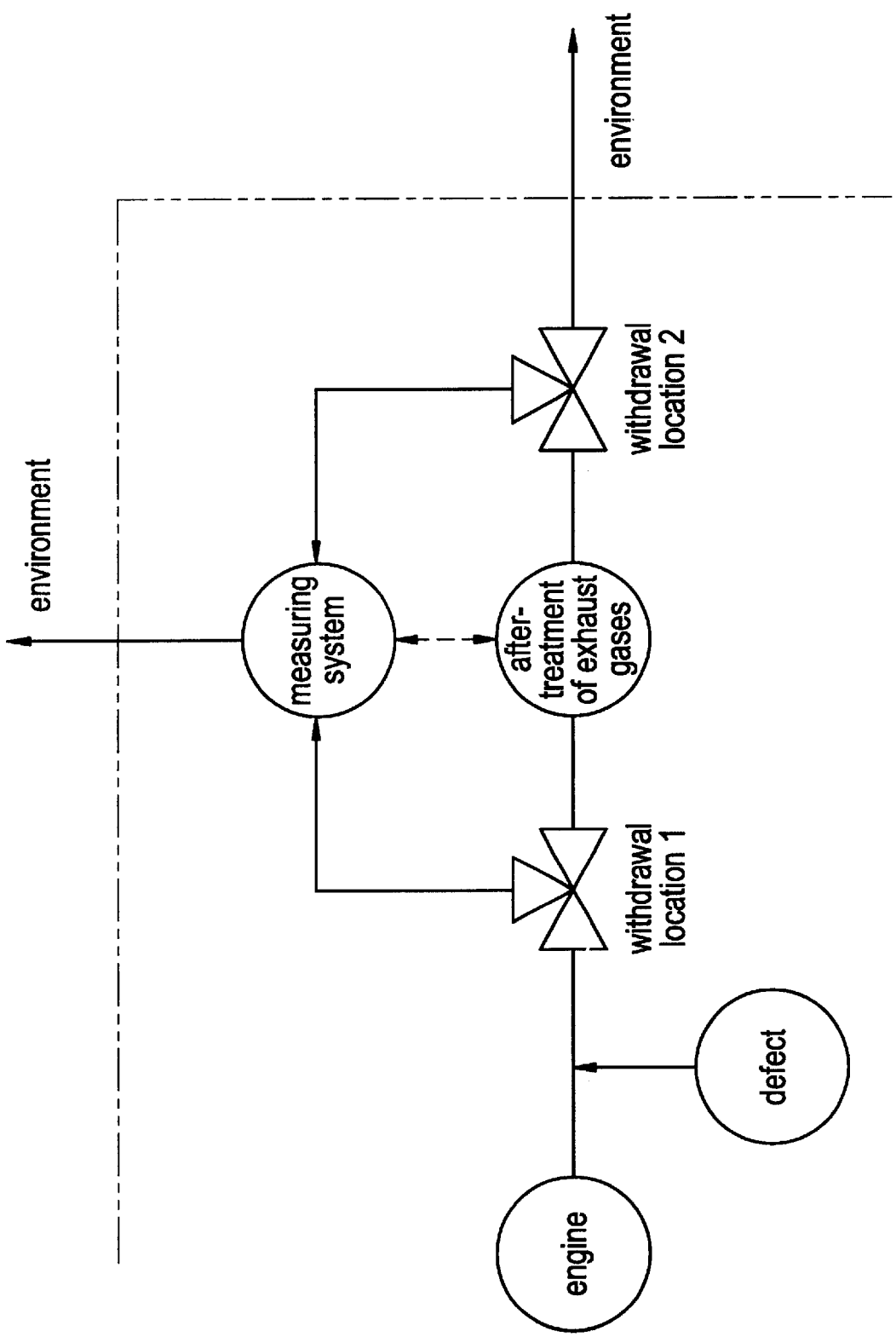
FIG. 3 schematically shows a set-up for comparative measurement.

In this case, the use of the accumulation method can be helpful. A specified defect may, for example, be simulated in the combustion process. This simulated defect may lead to defined emission quantities established behind the engine. The resulting vehicle emissions can be measured in front of and behind the catalytic converter and may serve as comparative figure as shown in FIG. 3. Exhaust gases are first measured after the engine, but still before the catalytic converter. These exhaust gases are untreated and serve to establish the original measuring signals to determine the characteristic features of the engine condition. The condition of the after-treatment system can be easily determined from the values measured behind the catalytic converter.

The alternating measurement of exhaust gases before and after the catalytic converter and the resulting values which are alternately fed to the analyzing system (high and low emission quantities), allow to save means and room in the vehicle since only one measuring instrument with one adjusted measuring range is required. This measuring instrument is designed according to the measuring range of the quantity after the catalytic converter. The necessary, see having a high measuring range can be adjusted by diluting it and, as a result, can be detected by the same measuring instrument featuring a finer resolution.

Figure 4:
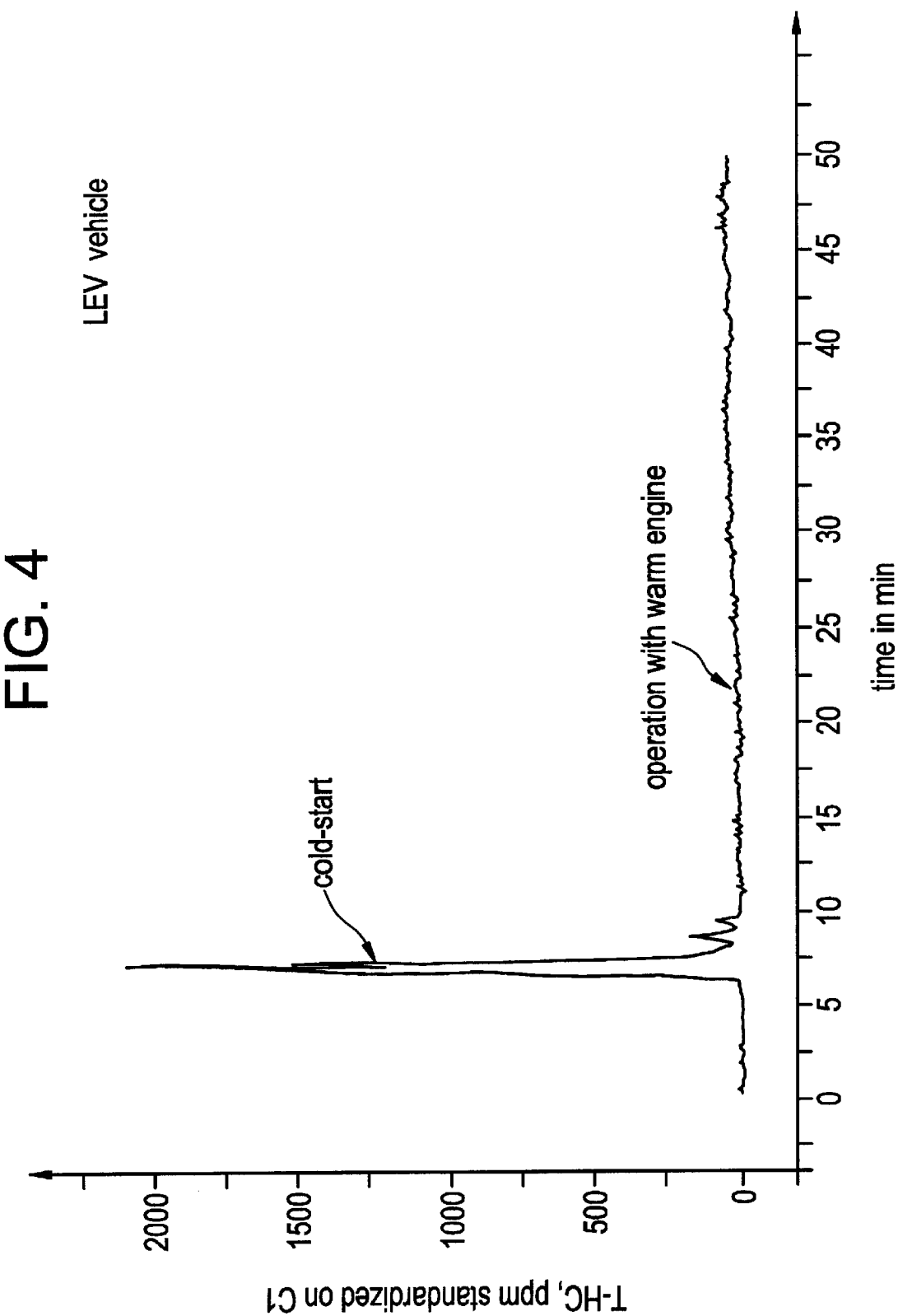
FIG. 4 is a graph of emissions during cold-start of LEV vehicle.

FIG. 4 discloses the performance of an LEV vehicle determined after the catalytic converter. Except for increased vehicle emissions during the cold-start period, the concentration of HC is very low. The quantities measured in the first 40–80 seconds after the start are high compared to the low level of vehicle emissions after this time period. They possibly amount to several 1000 ppm. As a result, they can be established easier by measurement than the lower quantities during subsequent operation when the engine is warm.

Figure 5:
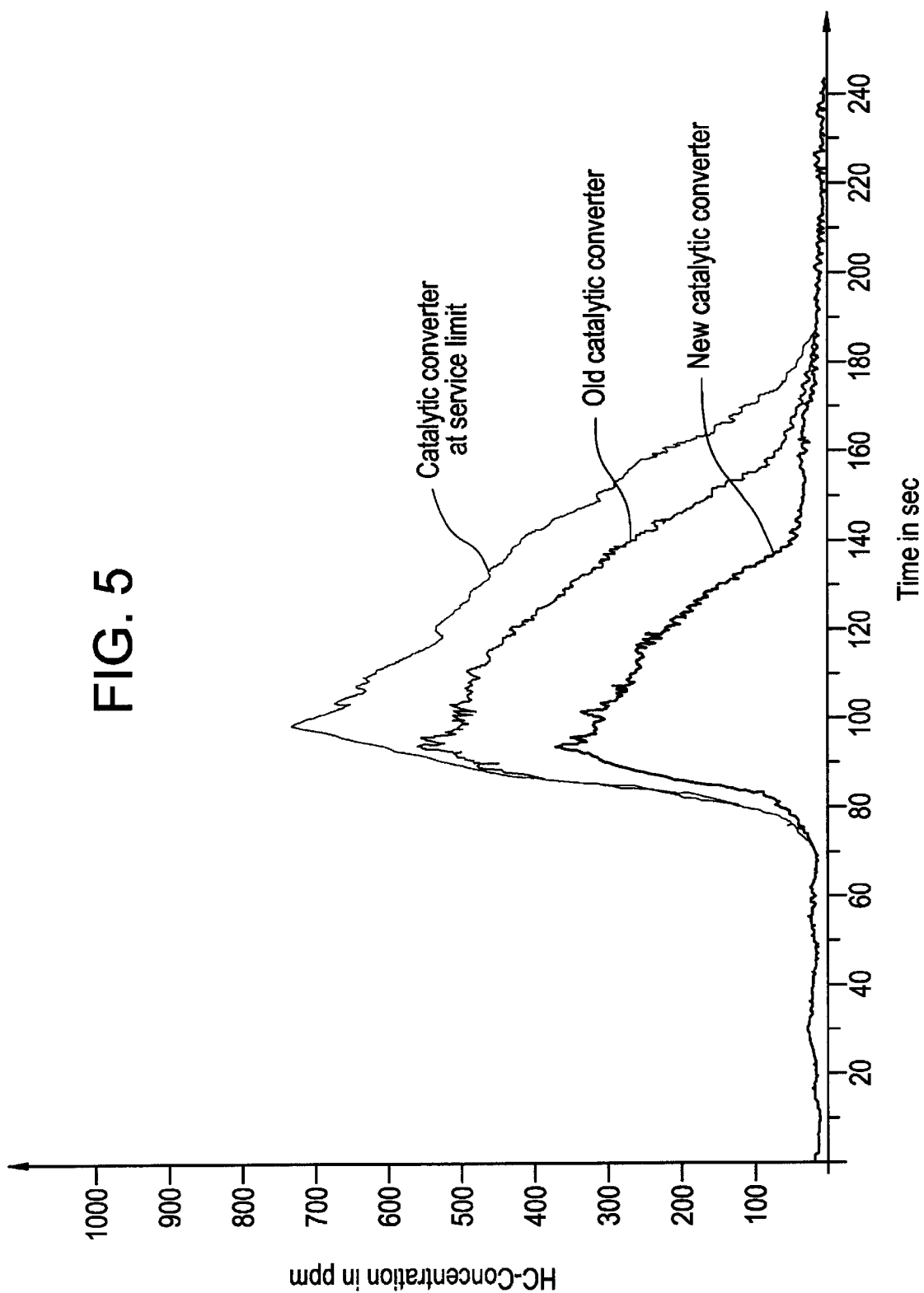
FIG. 5 is a graph of a cold-start period and increase in absolute emission of hydrocarbons due to the ageing catalytic converter.

Measurement during the cold-start period offers the advantage that, during this period, malfunctions in the exhaust gas after-treatment system are reflected in the diagram in a particularly striking fashion. FIG. 5 shows the increase of the cold-start peak due to ageing of the catalytic converter. In addition to an extended emission time relating to the required higher temperature of the catalytic converter, there is also a rise in the absolute peak of the vehicle emissions. The efficiency of the conversion process will be decreased due to a loss of active substances in the catalytic converter.

Figure 6:
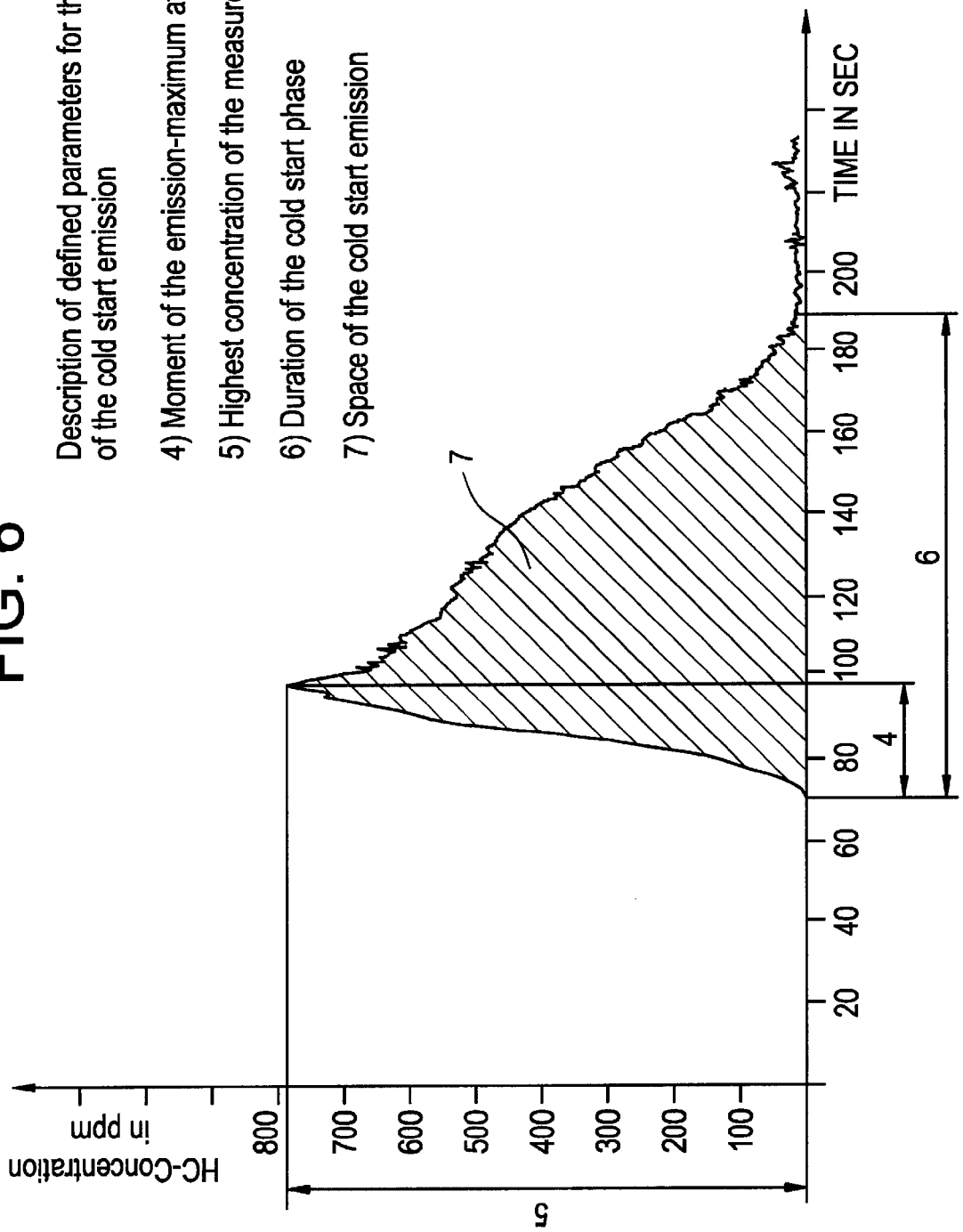
FIG. 6 is a graph of a description of parameters decisive for the mathematical analysis of cold-start emissions wherein 4 is the position of the emission maximum on the time axis after the start, 5 is the maximum quantity of established factor, 6 is the time required for the cold-start period, 7 is the area of cold-start emissions.

Shape and size of the cold-start peak reflect performance even with the latest vehicle models. IT is recommended to establish the position of the emission maximum on the time axis after the start 4, maximum quantity of measured factor 5, time required for the cold-start period 6 and the area of cold-start emissions 7 as shown in FIG. 6. Leaving the factory or the specialist workshop, each vehicle is equipped with an individual characteristic diagram which is established from the average taken from several cold-starts. The above-mentioned four characteristic quantities are stored in the vehicle. The corresponding environmental conditions, such as temperature of outer air, pressure, air humidity, etc., will be based on standard conditions. Any further cold-start periods are compared to this characteristic diagram and occurring changes realized on the basis of the above-stated four characteristic quantities 4–7 will be defined. If, in any of these changes, a predefined standard is exceeded, a warning signal is released.

In the following, processes shall be described which allow to take measures to reduce vehicle emissions to a minimum in case of increased emission values of the exhaust gases (cold-start/malfunction) or increased air pollution (high traffic volume).

Figure 7:
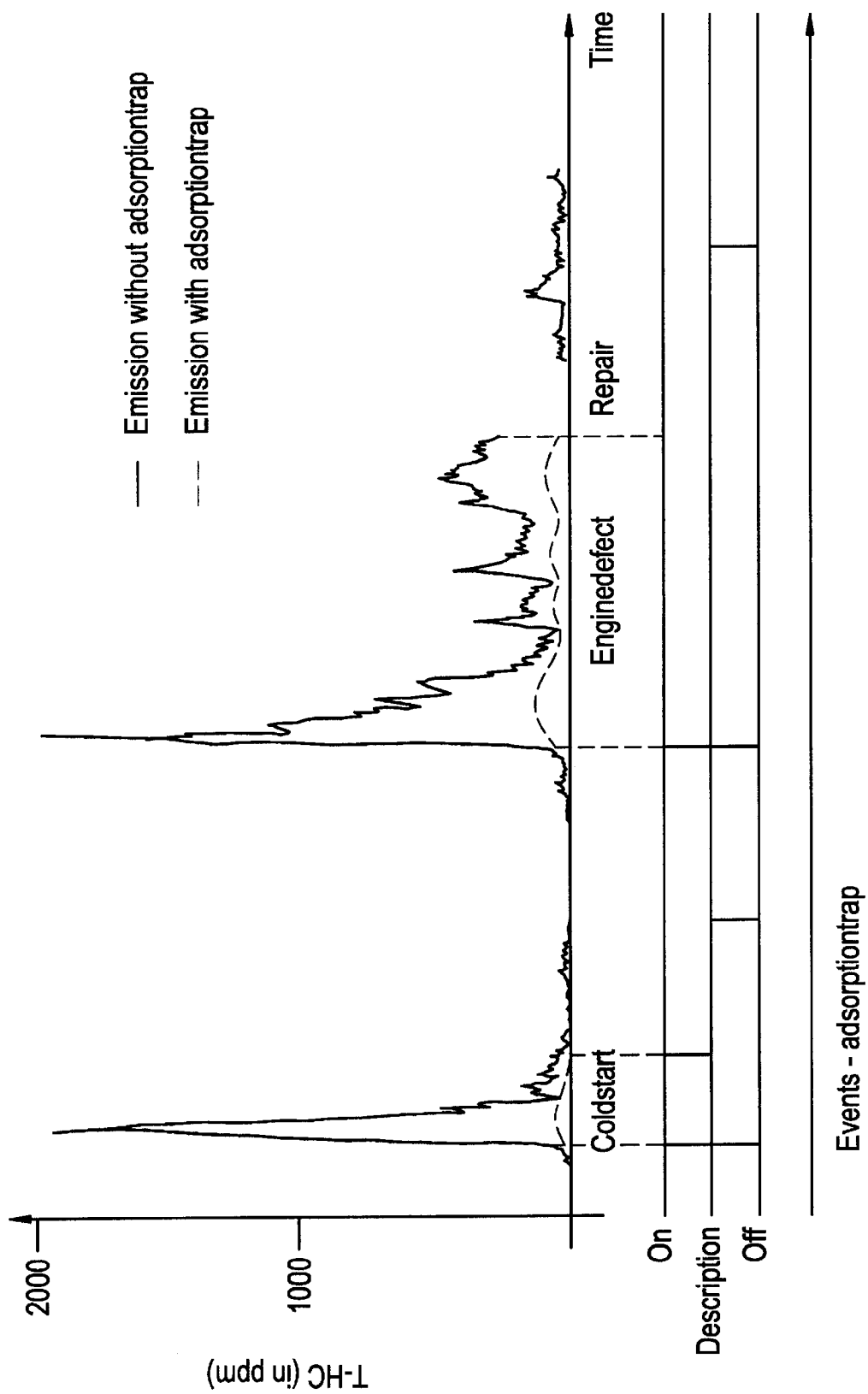
FIG. 7 is a graph of a measure to reduce emissions.

To reduce increased emission quantities, an adsorption system can be incorporated in the exhaust system as shown in FIG. 7. An adsorbent trap consists of at least one but preferably of several chemical substances which do not only retain hydrocarbons but also CO and NO molecules in the course of an appropriate adsorption process. This mixture may consist, for example, of activated coal, brown soil, also called hopcalite, and different zeolite substances.

Figure 8:
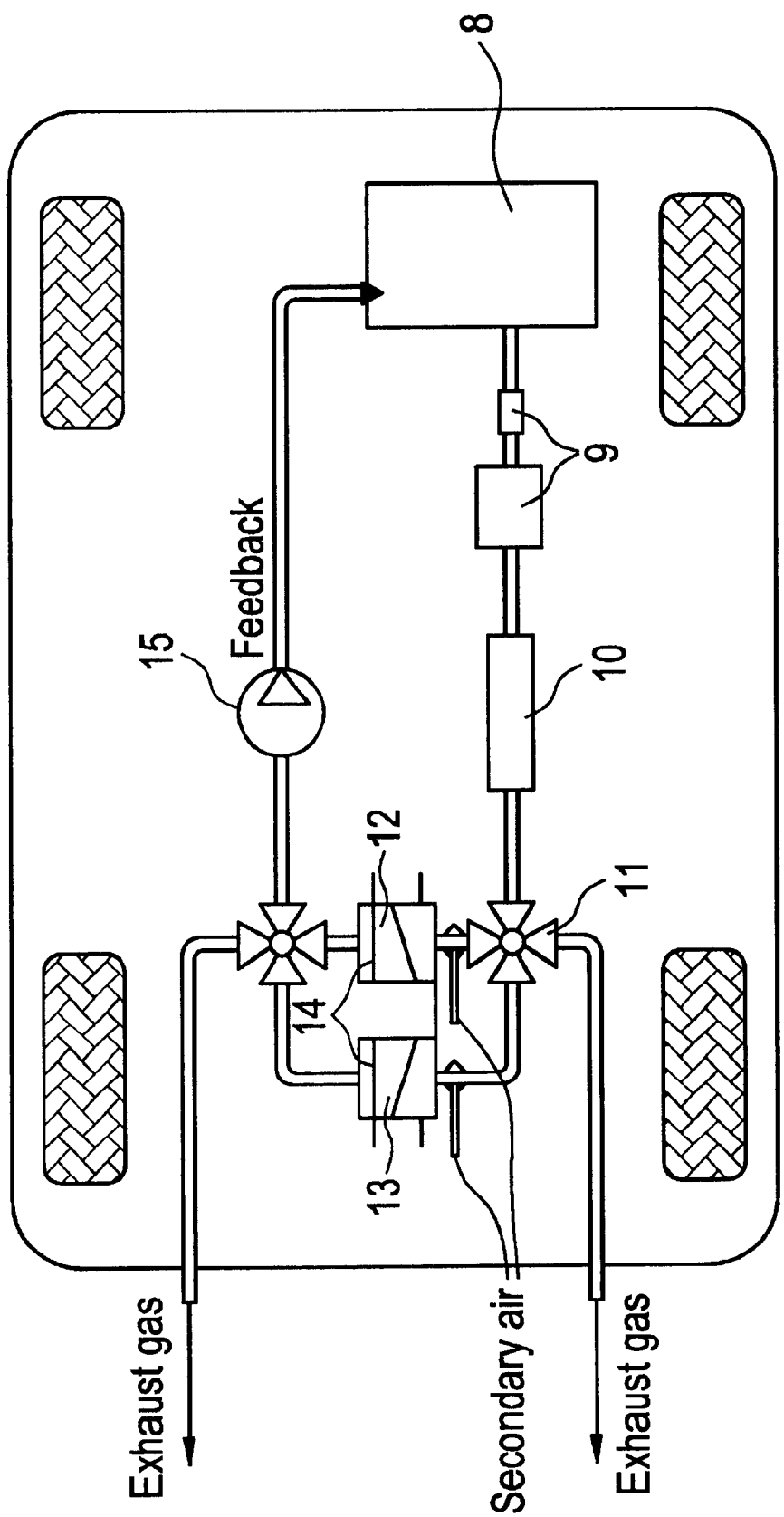
FIG. 8 is a schematic of an adsorption system in the exhaust system of a motor vehicle.

During normal operation, the exhaust gases freely flow into the air through the exhaust pipe. If, however, the vehicle is started after an extended period of rest or, if problems occur in the combustion 8 or exhaust gas after-treatment system 9, as shown in FIG. 8, the On-Board Monitoring system 10 (OBD or OBM system), in addition to informing the driver on the malfunction, reverts the flow of the exhaust gases by means of a valve 11. In case of high traffic volumes (jams, inner city), the adsorption system automatically operates or it can be added to the exhaust system by the driver according to the directives of the traffic routing system. After reversion, the exhaust gases are no longer allowed to freely flow into the air, instead they are guided through an adsorption system. The adsorption system consists of two adsorption traps for alternating operation 12 and 13. During cold-starts or in the case of malfunctions in the combustion or exhaust gas after-treatment system, the exhaust gas will be guided through an adsorption system. If defects occur in the combustion system, all pollutants will be stored until the defect is remedied.

In the case of defects in the exhaust gas after-treatment system, the absorption traps operate alternately and regenerate as the desorbed pollutants, after being concentrated, are recirculated into the combustion chamber (under the addition of secondary air) of the properly operating engine.

The desorption process is carried out by increasing the temperature with the help of a heating system 14 and/or by decreasing the pressure in the vacuum system 15. This process serves to bridge the time period between error message and remedial actions thereby preventing the vehicle emissions from rising. After the malfunction has been detected/indicated, the driver will be able to drive on for about 100–1000 km without problems which means virtually to the next repair shop even in areas which are not very densely populated.

Used adsorbent material which can no longer be regenerated is replaced in a simple manner and assisted by modular installment. The process of replacement is similar to the present oil filter change. Reprocessing of definitely used up adsorbent materials should be effected in an organized manner. Adsorbent bulk material can be disposed of such as waste oil today. The collected adsorbent materials may be further processed according the corresponding state-of-the-art.

Another possibility to reduce vehicle emissions during the cold-start period is the method in which the cold-start action is controlled uniformly and independently of the driver. In this method, the vehicle is equipped with an automatic starting device which performs the starting action automatically and in the best possible way. External conditions, such as temperature, air pressure, air humidity, wind force, wind direction, ice and the values of the On-Board Monitoring System are taken into account in the control process.

Amongst the greatest emitters in the vehicle industry are ships, airplanes and locomotives with non-electric drives.

All three transportation means have in common that they burn hydrocarbons and that the combustion products are released into the atmosphere in an uncontrolled fashion. For this reason, it is necessary to incorporate a measuring system into the combustion system through which the exhaust gases flow. Contact between measuring system and the flow of exhaust gases can be made directly or by means of a withdrawal location.

With locomotive 16, data can be stored and transferred by means of a computer connected to the measuring system via corresponding interfaces which collects data on a data carrier 17 and, after each travel, archives them, as shown in FIG. 9. Data can also be transferred by telephone 18 as is the case with today's Intercity trains. Already during traveling, data can be transferred to the corresponding locations where it is evaluated. On ships 19, it may be possible to transfer data collect on storage media, such as discs or various charts, either by means of direct evaluation of the data at the interface or via satellite 20. In airplanes 21, the use of micro systems and lightweight instrumentation is needed. During flying, data is stored on a micro data carrier. It is preferred to monitor all engines. Jet engines are designed as open systems, which force the hot, exhaust gases out into the atmosphere at great speeds. The measuring system needs to consider mixing ratios as well as external conditions. The most important aspect is the safe performance of the flying operation. Stored data may be evaluated by means of a data carrier on the ground or wireless in the air. The method of data transfer via satellite is also possible.

With all three transportation means, the primary task is to inform the ground personnel on non-standard events in the operation process. However, equally important is the collection of emission data. The evaluation systems on board need to be designed in a fashion that they release warning signals on board as soon as the set emission standards are exceeded. These signals may indicate deviations or malfunctions in the combustion or exhaust gas after-treatment system. This on-board monitoring system serves to increase the operational safety of the transportation means.

Each transportation means of above-mentioned categories needs to be equipped with stored characteristic diagrams providing information on emission standards both as individual processes with data on the dynamic behavior and as added sum. These systems need to contain exact data on allowed emission standards per km or mile. The evaluation device needs to contain accurate set parameters related to selected time segments, such as on the starting and landing operations of the airplane, starting or braking operations of diesel engines and maneuvering of ships in the harbor. These standards are designed according to the type, year of construction and according to further individual parameters of the transportation means.

Figure 10:
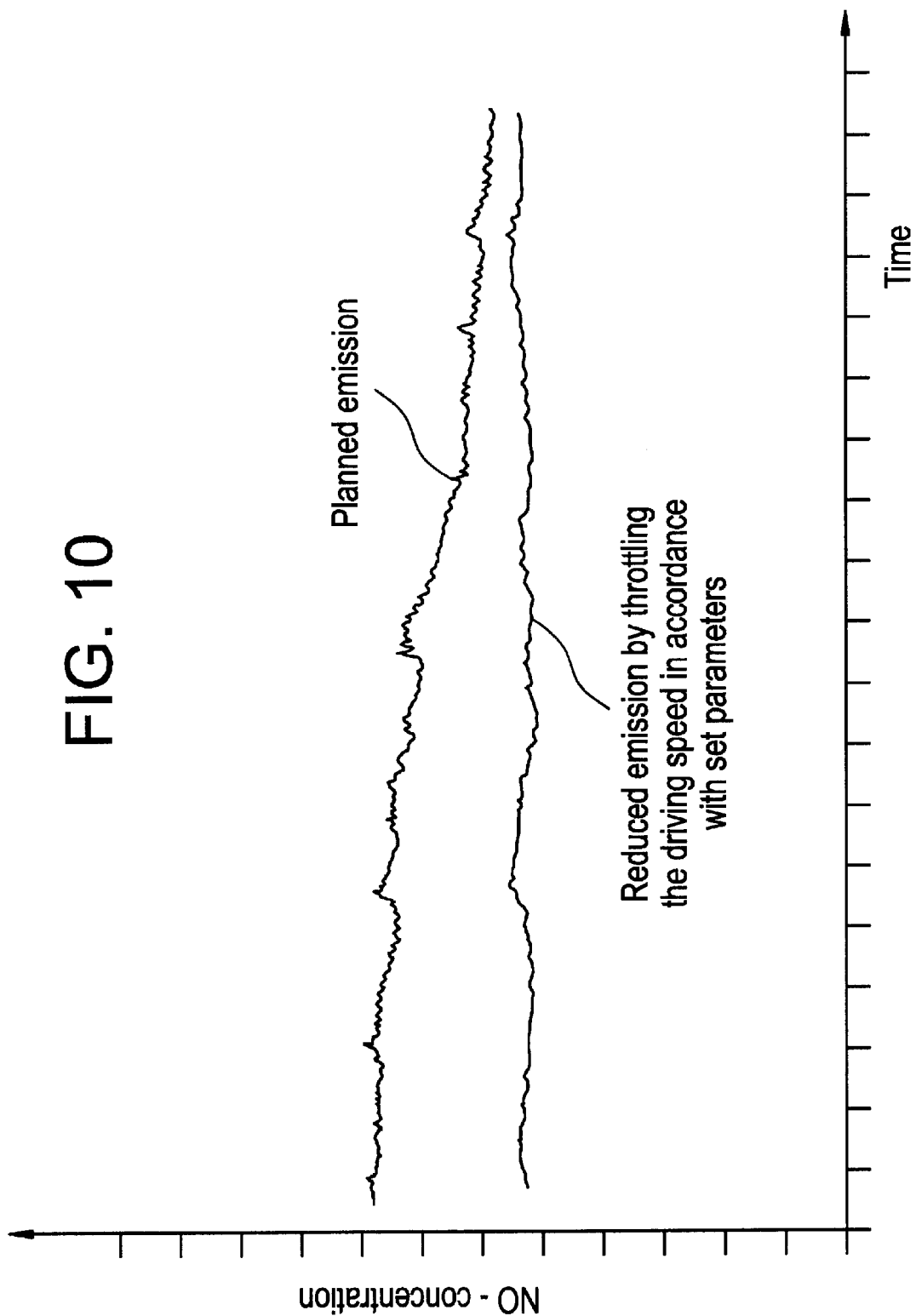
FIG. 10 is a graph of reduction of the driving speeds of ship due to emission-based parameters coming from a control center.

In case of an open control system, measuring is carried out with and without internal control and each current measuring value is compared to an archived characteristic diagram. If the emission standards are significantly exceeded, a warning signal is released. In the case of closed control systems, the transportation means is permanently connected to the corresponding process control systems. It may be necessary to adjust the driving or flying standards through the process control system. As a result, speeds may be reduced or increased due to emission reasons and even flying routes can be changed if such a change turns out to be necessary, as shown in FIG. 10. The process control center sets the necessary emission standards at times or places where emissions are particularly high. Any resulting advantages or disadvantages related to the fulfilment of the transportation task are considered in the evaluation system. All stored data is collected and transferred to an international evaluation system.

What is claimed is:

1. A method for measuring gas substance pollutants in exhaust gases emitted by an exhaust system of a vehicle comprising the steps of:

detecting at least one gas substance in the exhaust gases, the at least one gas substance selected from the group consisting of hydrocarbons (HC), carbon monoxides (CO), and nitrogen oxides (NO);

determining a maximum quantity of said gas substance emitted during a cold-start period;

determining the duration of said cold-start period;

determining a time of emission of said maximum quantity of said gas substance emitted by said vehicle;

determining an area under a curve defined by said emission of said gas substance over time; and assessing said gas substances in said exhaust gases using said determination of said maximum quantity of said gas substances emitted, said time of emission of said maximum quantity of said gas substance emitted, said duration of cold-start period, and said area under said curve defined by said emission of said gas substance over time.

2. The method of claim 1, further comprising the steps of:

subjecting said vehicle to said cold-start period to produce test data of said emission of said gas substance over time;

comparing at least a portion of said test data to predetermined conditions; and generating a warning signal if said portion of said test data deviates from said predetermined conditions.

3. The method of claim 1, wherein said exhaust system includes a catalytic converter and said method further comprises the steps of:

incorporating malfunctions into said vehicle as model situations to define an increase in gas substance quantities;

measuring said emission of said gas substance before said catalytic converter;

measuring said emission of said gas substance after said catalytic converter;

comparing said emission before said catalytic converter with said emission after said catalytic converter and said defined increase in gas substance quantities to assess said gas substances in said exhaust.

4. The method of claim 1, further comprising generating a control condition for environmental parameters that includes one or more selected from the group consisting of outside temperature, air pressure, and humidity with an on-board monitoring system; to achieve a substantially uniform start of said vehicle.

* * * * *